(12) United States Patent
Xie et al.

(10) Patent No.: US 12,413,936 B2
(45) Date of Patent: Sep. 9, 2025

(54) TRANSMISSION MODE CONVERSION INDICATION METHOD, ACCESS NETWORK DEVICE, AND TERMINAL DEVICE

(71) Applicant: VIVO MOBILE COMMUNICATION CO., LTD., Dongguan (CN)

(72) Inventors: Zhenhua Xie, Dongguan (CN); Yanxia Zhang, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 449 days.

(21) Appl. No.: 17/940,468

(22) Filed: Sep. 8, 2022

(65) Prior Publication Data

US 2023/0007533 A1   Jan. 5, 2023

Related U.S. Application Data

(63) Continuation of application No. PCT/CN2021/082366, filed on Mar. 23, 2021.

(30) Foreign Application Priority Data

Mar. 23, 2020 (CN) .......................... 202010208861.4

(51) Int. Cl.
*H04W 4/06* (2009.01)
*H04W 24/02* (2009.01)

(52) U.S. Cl.
CPC ............. *H04W 4/06* (2013.01); *H04W 24/02* (2013.01)

(58) Field of Classification Search
CPC ................................ H04W 4/06; H04W 24/02
See application file for complete search history.

(56) References Cited

U.S. PATENT DOCUMENTS

| 10,827,463 | B2 | 11/2020 | Zhao et al. |
| 11,071,089 | B2 | 7/2021 | Chandramouli et al. |
| 11,259,361 | B2 | 2/2022 | Huang et al. |
| 11,290,854 | B2 | 3/2022 | Natarajan et al. |
| 2003/0054807 | A1* | 3/2003 | Hsu ........................ H04W 72/30 455/414.1 |
| 2019/0059074 | A1 | 2/2019 | Ozturk et al. |
| 2020/0267513 | A1 | 8/2020 | Zhu et al. |
| 2021/0068003 | A1 | 3/2021 | Kadiri et al. |

(Continued)

FOREIGN PATENT DOCUMENTS

| CN | 102651846 A | 8/2012 |
| CN | 107371138 A | 11/2017 |
| CN | 108886669 A | 11/2018 |

(Continued)

OTHER PUBLICATIONS

Vivo et al., "Solution for unicast switch to multicast based on network control", SA WG2 Meeting #136AH, Seoul, Korea, Jan. 13-17, 2020, S2-2001358.

(Continued)

*Primary Examiner* — Kevin C. Harper
(74) *Attorney, Agent, or Firm* — The Webb Law Firm

(57) ABSTRACT

A transmission mode conversion indication method includes: sending a first message to a core network or sending a second message to a terminal device, so as to indicate that a transmission mode conversion is required, where the first message carries first user information and first multicast group information.

15 Claims, 5 Drawing Sheets

(56) References Cited

U.S. PATENT DOCUMENTS

2022/0053456 A1 2/2022 Lei
2023/0345310 A1* 10/2023 Li .......................... H04W 4/06

FOREIGN PATENT DOCUMENTS

| CN | 109982266 A | 7/2019 |
|---|---|---|
| CN | 110651489 A | 1/2020 |
| CN | 110809299 A | 2/2020 |
| KR | 1020120073142 A | 7/2012 |
| WO | 2019091456 A1 | 5/2019 |

OTHER PUBLICATIONS

CATT, R2-2006594, "Discussion on Dynamic PTM and PTP Switch with Service Continuity", 3GPP TSG-RAN WG2 Meeting #111, Aug. 7, 2020.

Nokia, S2-1911366, "PDU session enhanced for multicast to provide the basic multicast connectivity service", SA WG2 Meeting #S2-136, Nov. 8, 2019.

Vivo, S2-2000149, "Solution for multicast switch to unicast based on application level control", SA WG2 Meeting #136AH, Jan. 2, 2020.

Vivo, S2-2004106, "KI #7, New Sol: Mode switch between multicast and unicast", SA WG2 Meeting #139E e-meeting, May 22, 2020.

* cited by examiner

100

S110

Send a first message to a core network, or send a second message to a terminal device to indicate that a transmission mode conversion is required, where the first message carries first user information and first multicast group information

Receive a first message carrying first multicast group information and first user information, or invoke an operation with first multicast group information and first user information as parameters

S212

Send a transmission mode conversion indication to a terminal device associated with the first user information

Receive a transmission mode conversion indication, and perform a transmission mode conversion according to the transmission mode conversion indication

FIG. 3

TRANSMISSION MODE CONVERSION INDICATION METHOD, ACCESS NETWORK DEVICE, AND TERMINAL DEVICE

CROSS-REFERENCE TO RELATED APPLICATIONS

The present application is a Bypass Continuation application of PCT/CN2021/082366 filed on Mar. 23, 2021, which claims priority to Chinese Patent Application No. 202010208861.4 filed Mar. 23, 2020, the disclosures of which are hereby incorporated by reference in their entirety.

BACKGROUND OF THE INVENTION

Field of the Invention

The present disclosure relates to the field of communication, and in particular, to a transmission mode conversion indication method, an access network device, and a terminal device.

Description of Related Art

When providing content services for a terminal device, a network side may send data to a peer terminal device through a point-to-point transmission mode. For example, in a dedicated mode, a core network and a base station transmit service data by using a transmission channel that is dedicated to each user.

Alternatively, in order to efficiently utilize mobile network resources to implement resource sharing of networks (including core networks and access networks), so as to provide services for as many users with the same needs as possible with as few resources as possible, a point-to-multipoint transmission mode may also be adopted. For example, in a shared mode, the core network and the base station transmit the service data by using a transmission channel shared by a plurality of users.

When providing content services for the terminal device, an application server may send data to the peer terminal device through the point-to-point transmission mode. For example, in a unicast mode, the application server respectively sends data to a target by using IP addresses of different terminals.

Alternatively, in order to efficiently utilize mobile network resources to implement resource sharing of networks (including core networks and access networks), so as to provide services for as many users with the same needs as possible with as few resources as possible, a point-to-multipoint transmission mode may also be adopted. For example, in a multicast mode, the application server sends one piece of data to the target by using a multicast IP address, and the data is distributed by a network to members of a corresponding multicast group.

SUMMARY OF THE INVENTION

The embodiments of the present disclosure provide a transmission mode conversion indication method, an access network device, a core network device, and a terminal device.

According to a first aspect, a transmission mode conversion indication method is provided and performed by a base station. The method includes: sending a first message to a core network or sending a second message to a terminal device, so as to indicate that a transmission mode conversion is required, where the first message carries first user information and first multicast group information.

According to a second aspect, a transmission mode conversion indication method is provided and performed by a network function node. The method includes: receiving a first message carrying first multicast group information and first user information, or invoking an operation with first multicast group information and first user information as parameters; and sending a transmission mode conversion indication to a terminal device associated with the first user information.

According to a third aspect, a transmission mode conversion indication method is provided and performed by a terminal device. The method includes: receiving a transmission mode conversion indication, and performing a transmission mode conversion according to the transmission mode conversion indication.

According to a fourth aspect, an access network device is provided and includes: a sending module, configured to send a first message to a core network or send a second message to a terminal device, so as to indicate that a transmission mode conversion is required, where the first message carries first user information and first multicast group information.

According to a fifth aspect, a core network device is provided and includes: a triggering module, configured to trigger a sending module in a case that a first message carrying first multicast group information and first user information is received, or an operation with first multicast group information and first user information as parameters is invoked; and the sending module, configured to send a transmission mode conversion indication to a terminal device associated with the first user information.

According to a sixth aspect, a terminal device is provided and includes: a receiving module, configured to receive a transmission mode conversion indication, and perform a transmission mode conversion according to the transmission mode conversion indication.

According to a seventh aspect, an access network device is provided and includes: a memory, a processor, and a computer program stored on the memory and executable on the processor, the computer program, when executed by the processor, implementing the steps of the method according to the first aspect.

According to an eighth aspect, a core network device is provided and includes: a memory, a processor, and a computer program stored on the memory and executable on the processor, the computer program, when executed by the processor, implementing the steps of the method according to the second aspect.

According to a ninth aspect, a terminal device is provided and includes: a memory, a processor, and a computer program stored on the memory and executable on the processor, the computer program, when executed by the processor, implementing the steps of the method according to the third aspect.

According to a tenth aspect, a non-transitory computer-readable storage medium is provided and stores a computer program thereon, the computer program, when executed by a processor, implementing the steps of the method according to the first aspect or the second aspect or the third aspect.

BRIEF DESCRIPTION OF THE DRAWINGS

Accompanying drawings described herein are used for providing further understanding about the present disclosure, and constitute a part of the present disclosure. Exemplary embodiments of the present disclosure and descriptions thereof are used for explaining the present disclosure, and do not constitute an inappropriate limitation on the present disclosure. In the accompanying drawings:

FIG. 1 is a schematic flowchart of a transmission mode conversion indication method according to an embodiment of the present disclosure;

FIG. 2 is another schematic flowchart of a transmission mode conversion indication method according to an embodiment of the present disclosure;

FIG. 3 is a schematic flowchart of a transmission mode conversion indication method according to an embodiment of the present disclosure;

DESCRIPTION OF THE INVENTION

Figure 4:
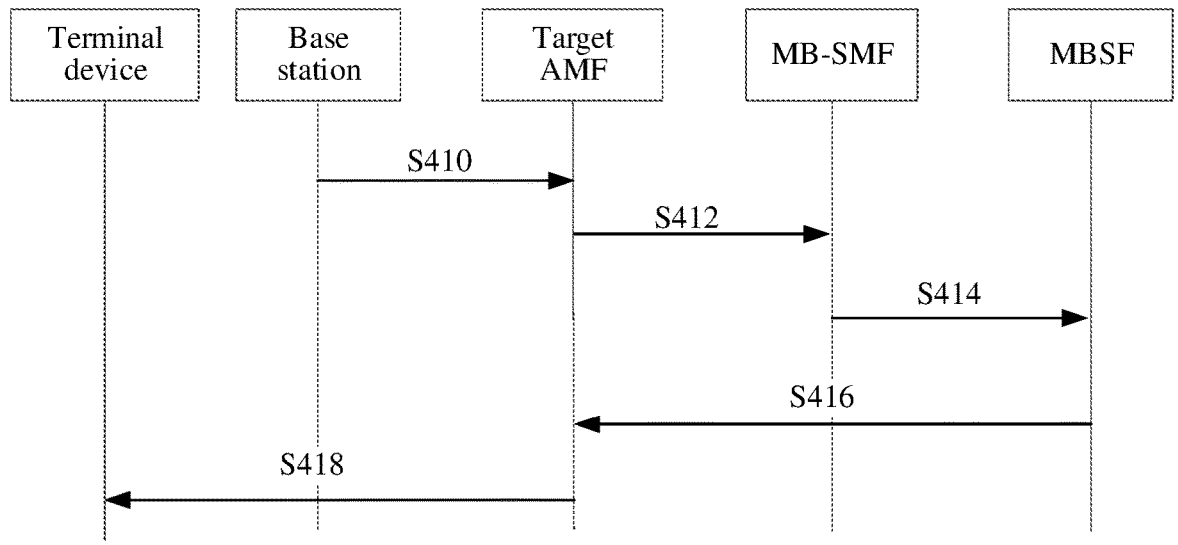
FIG. 4 is another schematic flowchart of a transmission mode conversion indication method according to an embodiment of the present disclosure.

The technical solutions in embodiments of the present disclosure are described clearly below with reference to the accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

The technical solutions of the present disclosure may be performed by various communication systems, such as: a Global System for Mobile Communications (GSM) system, a Code Division Multiple Access (CDMA) system, Wideband Code Division Multiple Access (WCDMA), a general packet radio service (GPRS), and a long term evolution (LTE)/long term evolution advanced (LTE-A), and New Radio (NR).

User equipment (UE), also referred to as a terminal device, a mobile terminal, mobile user equipment, and the like, may communicate with one or more core networks through a radio access network (RAN) and the like. The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges languages and/or data with the radio access network.

A base station may be a base transceiver station (BTS) in GSM or CDMA, or may be a NodeB in WCDMA, or may be an evolved NodeB (eNB or e-NodeB) and a 5G base station (gNB) in LTE. This is not limited in the present disclosure. However, for ease of description, the following embodiments are described by using a gNB as an example.

When providing the content services for the terminal device, the network side adopts the dedicated mode or the shared mode for transmission. When providing the content services for the terminal device, the application server adopts the unicast mode or the multicast mode for transmission. However, in the related art, there is no solution for conversion among four transmission modes that is triggered by the network side, and therefore the reasonable utilization of resources cannot be ensured.

The technical solutions provided in the embodiments of the present disclosure are described in detail below with reference to the accompanying drawings.

FIG. 1 is a schematic flowchart of a transmission mode conversion indication method according to an embodiment of the present disclosure. The method 100 may be performed by a base station. In other words, the method may be performed by software or hardware installed on the base station. As shown in FIG. 1, the method may include the following steps.

S110: Send a first message to a core network or send a second message to a terminal device, so as to indicate that a transmission mode conversion is required, where the first message carries first user information and first multicast group information.

In this embodiment of the present disclosure, the first user information carried in the first message sent to the core network is used for indicating a terminal device that needs to perform the transmission mode conversion. After receiving the first message, the core network may send, according to the first user information, a transmission mode conversion indication to a terminal device associated with the first user information to indicate that the corresponding terminal device performs the transmission mode conversion.

In this embodiment of the present disclosure, in a case that the transmission mode conversion is required, the base station may indicate that the core network or the terminal device needs to perform the transmission mode conversion, and carry first multicast (group-cast or multicast) group information indicating a multicast service that requires the transmission mode conversion, so that the base station may determine whether to convert a transmission mode of multicast service data according to a specific scenario situation.

In a possible implementation, the second message may alternatively carry the first multicast group information indicating the multicast service that requires the transmission mode conversion. Certainly, the second message may alternatively not carry the first multicast group information, and then it indicates that multicast services that require the transmission mode conversion are all current multicast services of the UE.

In a possible implementation, the first message and the second message may carry mode information. The mode information is used for indicating the transmission mode of the multicast service data. Through the mode information, the core network or the terminal device may determine the transmission mode of the multicast service data corresponding to the first multicast group information after conversion.

Optionally, the transmission mode may include at least one of the following: a shared mode, a dedicated mode, a unicast mode, or a multicast mode.

In an actual application, the first message or the second message may alternatively not carry the mode information, and then it may be predetermined that the first message and the second message indicate a converted transmission mode by default. For example, it may be converted into the shared mode by default. Certainly, this is not limited herein, and it may also be converted into the dedicated mode or other transmission modes by default.

In a possible implementation, the first multicast group information may include a multicast group identifier or a multicast group identifier list, for example, a temporary mobile group identifier (TMGI) or a TMGI list, that is used for indicating the multicast service that requires the transmission mode conversion. The multicast group identifier list may include a plurality of multicast group identifiers. That is, there may be one or more multicast group services that require the transmission mode conversion.

In a possible implementation, the first user information may be a first user identifier or may be a first user identifier list. The first user identifier list may include a plurality of first user identifiers that are used for indicating users that require the transmission mode conversion. For example, a globally unique temporary user terminal identifier (GUTI) or a GUTI list indicates one or more users that require the transmission mode conversion.

In a possible implementation, before S110, the method may further include: receiving a third message sent by the terminal device, where the third message carries second user information and second multicast group information, and the second multicast group information is used for indicating a multicast group that requires the transmission mode conversion. That is, in this possible implementation, the base station may indicate, after receiving the third message sent by the terminal device, that the core network or the terminal device needs to perform the transmission mode conversion.

In the foregoing possible implementation, the second multicast group information may include a multicast group identifier or a multicast group identifier list. That is, the terminal device indicates that there may be one or more multicast group services that require the transmission mode conversion.

In the foregoing possible implementation, the second user information may include: a second user identifier, and the second user identifier is used for indicating the terminal device that sends the third message.

In an application, the first user information includes at least the second user information. That is, the base station indicates that the terminal device that needs to perform the transmission mode conversion includes at least the terminal device that sends the third message, and may also include other terminal devices.

Similarly, the first multicast group information may include at least the second multicast group information. That is, the base station indicates that the multicast service data that requires the transmission mode conversion includes at least the multicast service data indicated by the second multicast group information.

For example, in an application, a first terminal device determines, according to a situation thereof, that a transmission mode of a certain piece of multicast service data needs to be converted into the shared mode, and then sends a third message to the base station. The message carries user information of the first terminal device and multicast group information 1 of the multicast service data of which a transmission mode needs to be converted into the shared mode. A second terminal device under the same base station determines, according to a situation thereof, that a transmission mode of a certain piece of multicast service data needs to be converted into the shared mode, and then sends a third message to the base station. The message carries user information of the second terminal device and multicast group information 2 of the multicast service data of which a transmission mode needs to be converted into the shared mode. The base station sends, after receiving the third message from the first terminal device and the second terminal device, a first message to the core network. First user information carried in the first message may include the user information of the first terminal device and the user information of the second terminal device. First multicast group information carried in the first message may include the multicast group information 1 and the multicast group information 2. Certainly, this is not limited herein. The base station may also send, after receiving the third message sent by the first terminal device, a first message to the core network. First user information carried in the first message is the user information of the first terminal device, and first multicast group information is the multicast group information 1. This may be specifically determined according to an actual application.

In a possible implementation, after the sending a second message to a terminal device, the method further includes: receiving a mode conversion request sent by the terminal device, where the mode conversion request carries the first multicast group information; and sending a fourth message to the core network, where the fourth message includes the mode conversion request and a trigger indication, where the trigger indication is used for indicating that the mode conversion request is triggered by a radio access network node. That is, the base station may add, after receiving the mode conversion request sent by the terminal device, a trigger indication on the basis of the mode conversion request, and then forward the mode conversion request and the trigger indication to the core network. Through this optional implementation, the core network determines, after receiving the mode conversion request, that the mode conversion request is triggered by a radio access network node (for example, the base station), and is a trigger that can be trusted, thereby releasing a service of the base station to a user plane corresponding to the multicast group identifier or the multicast group identifier list carried in the mode conversion request.

In a possible implementation, the base station may also determine, according to a current scenario, whether to send the first message or the second message. In this possible implementation, before S110, the method may further include: determining that a quantity of target users is greater than or less than a preset transmission mode conversion trigger condition, where the quantity of target users is a total quantity of users receiving a multicast service corresponding to the first multicast group information; or determining, based on a resource status of the base station, that the transmission mode conversion is required. For example, a current transmission mode of one or more multicast group services is the shared mode, and the base station determines that a current quantity of target users of the multicast services is less than the preset transmission mode conversion trigger condition, and then sends the first message or the second message to indicate that the transmission mode of the multicast services is converted into the dedicated mode. In addition, user information currently using the multicast services may be carried in the first message. Through this possible implementation, the base station may convert the transmission mode of the multicast service data in a case that a quantity of users receiving a multicast service changes or in a case that a resource status of the base station changes, thereby ensuring the utilization of the resources.

FIG. 2 is another schematic flowchart of a transmission mode conversion indication method according to an embodiment of the present disclosure. The method 200 may be performed by a network function node. In other words, the method may be performed by software or hardware installed on the network function node. In an actual application, network functions of a plurality of core networks may be integrated on the network function node. As shown in FIG. 2, the method may include the following steps.

S210: Receive a first message carrying first multicast group information and first user information, or invoke an operation with first multicast group information and first user information as parameters.

In this embodiment of the present disclosure, network functions of a plurality of core networks are integrated on the network function node, including but not limited to: an access control and mobility management function (AMF), an multicast broadcast session management function (MB-SMF), and an multicast broadcast service function (MBSF).

In this embodiment of the present disclosure, the transmission mode conversion may be determined by the AMF or the MBSF. If the transmission mode conversion is determined by the AMF, after receiving the first message carrying the first multicast group information and the first user information that is sent by the base station, the AMF determines that the transmission mode conversion is performed. If the transmission mode conversion is determined by the MBSF, the MBSF determines that the transmission mode conversion is performed in a case that an operation with the first multicast group information and the first user information as parameters is invoked. For example, after receiving the first message, the AMF invokes a multicast session update operation such as a Nmbsmf_Session_Update operation of the MB-SMF. The MB-SMF invokes a mode conversion notification operation such as an Nmbsf_ModeSwitch_Notify operation of the MB SF.

In the method 200, the first message may be the first message sent by the base station to the core network in the method 100. For details, reference may be made to the description in the method 100. Details are not described herein again.

In the method 200, the first multicast group information as an invocation parameter is the same as the first multicast group information carried in the first message. For details, reference may be made to the description in the method 100. Details are not described herein again.

In the method 200, the first user information as an invocation parameter may be the same as or may be different from the first user information carried in the first message. For example, after receiving a first message carrying a user identifier 1 (for example, a 5G_GUTI), the AMF may find, by using the user identifier 1, an original AMF that serves the user and obtain a corresponding user identifier 2 such as a subscription permanent identifier (SUPI) from the original AMF. The AMF invokes the multicast session update operation of the MB-SMF. Parameters used by the AMF include a group identifier or a group identifier list, may also include the user identifier 2 or a user identifier 2 list, or may include the user identifier 1 or a user identifier 1 list, and may also include an identifier of the AMF. If there are a plurality of multicast group identifiers, the AMF may perform an invocation for each multicast group identifier. The MB-SMF invokes, in a case that the multicast session update operation is performed, the mode conversion notification operation of the MBSF, and carries one or more multicast group identifiers, may also carry one or more user identifiers 1 or one or more user identifiers 2, and may also carry the identifier of the AMF.

S212: Send a transmission mode conversion indication to a terminal device associated with the first user information.

In a possible implementation, if the first user information includes a first user identifier such as a 5G_GUTI, in S212, the transmission mode conversion indication is sent to the terminal device indicated by the first user identifier. Alternatively, a second user identifier such as an SUPI is obtained according to the first user identifier such as a 5G_GUTI, and the transmission mode conversion indication is sent to a terminal device indicated by the second user identifier. If the first user information includes a first user identifier list, in S212, the transmission mode conversion indication is sent to one or more terminal devices indicated by the first user identifier list. Alternatively, a second user identifier list is obtained according to the first user identifier list, and the transmission mode conversion indication is sent to one or more terminal devices indicated by the second user identifier list.

In a possible implementation, the transmission mode conversion indication includes third multicast group information, and the third multicast group information is used for indicating a multicast group on which the transmission mode conversion is performed. In an application, the third multicast group information may be the same as or may be different from the first multicast group information. For example, the third multicast group information may be a part of the first multicast group information.

In the foregoing possible implementation, the third multicast group information may include: a multicast group identifier or a multicast group identifier list.

In a possible implementation, the transmission mode conversion indication may further include mode information. The mode information is used for indicating a transmission mode of multicast service data. Optionally, the transmission mode comprises one of the following: a dedicated mode, a shared mode, a unicast mode, and a multicast mode.

In a possible implementation, after S212, the method may further include: receiving a mode conversion request sent by the terminal device, where the mode conversion request carries the third multicast group information; and invoking a session update operation by using the third multicast group information and a trigger indication as invocation parameters, and releasing a connection corresponding to the third multicast group information. For example, after the AMF sends a transmission mode conversion indication to the UE, the UE performs a transmission mode conversion after receiving the transmission mode conversion indication, and then sends a mode conversion request to the AMF. The request carries third multicast group information. The AMF adds, after receiving the request, a trigger indication to the request, and invokes the multicast session operation of the MB-SMF. The MB-SMF determines, according to the trigger indication, that the mode conversion request is credible, and releases a service of the base station to a user plane corresponding to the third multicast group information.

Through the foregoing transmission mode conversion indication method provided in this embodiment of the present disclosure, a network function node of a core network sends, in a case of receiving a first message carrying first multicast group information and first user information or invoking an operation with first multicast group information and first user information as parameters, a transmission mode conversion indication to a terminal device associated with the first user information, and therefore may convert a transmission mode of multicast service data of the terminal device associated with the first user information, and it is not limited to transmitting the multicast service data in only one transmission mode.

FIG. 3 is a schematic flowchart of a transmission mode conversion indication method according to an embodiment of the present disclosure. The method 300 may be performed by a terminal device. In other words, the method may be performed by software or hardware installed on the terminal device. As shown in FIG. 3, the method may include the following steps.

S310: Receive a transmission mode conversion indication, and perform a transmission mode conversion according to the transmission mode conversion indication.

The transmission mode conversion indication received by the terminal device in S310 is the same as the transmission mode conversion indication sent by the network function node in the method 200. For details, reference may be made to the description in the method 200.

In a possible implementation, the transmission mode conversion indication includes a multicast group identifier or a multicast group identifier list. The multicast group identifier or the multicast group identifier list indicates multicast service data that requires a transmission mode conversion. That is, a transmission mode for transmitting the multicast service data indicated by the multicast group identifier or the multicast group identifier list is converted.

In a possible implementation, the transmission mode conversion indication may further include mode information. The mode information is used for indicating a transmission mode of the multicast service data. The terminal device converts, after receiving the transmission mode conversion indication, the transmission mode of the multicast service data indicated by the multicast group identifier or the multicast group identifier list into the transmission mode indicated by the mode information.

As described in the method 100 and method 200, the transmission mode may include one of the following: a dedicated mode, a shared mode, a unicast mode, and a multicast mode.

In a possible implementation, before S310, the method may further include: sending a third message to a network side, where the third message carries second multicast group information. That is, the terminal device may trigger the network side by sending the third message to switch a transmission mode.

In a possible implementation, the second multicast group information includes: a multicast group identifier or a multicast group identifier list. The multicast group identifier or the multicast group identifier list may be the same as or may be different from the multicast group identifier or the multicast group identifier list included in the transmission mode conversion indication. For example, the terminal device requests to switch a transmission mode of multicast service data 1 corresponding to a multicast group identifier 1, and the core network determines, according to a network condition, that multicast group services that require switching also include a multicast group service 2. Therefore, a multicast group identifier in a transmission mode conversion indication returned by the network side includes the multicast group identifier 1 and a multicast group identifier 2 corresponding to the multicast group service 2.

Through the transmission mode conversion indication method provided in this embodiment of the present disclosure, a terminal device may perform a transmission mode conversion according to a received transmission mode conversion indication, and therefore may convert a transmission mode of service data according to the indication of a network side, to achieve a flexible transmission mode conversion.

FIG. 4 is another schematic flowchart of a transmission mode conversion indication method according to an embodiment of the present disclosure. The method 400 is implemented by a base station and a network function node of a core network. In other words, the method may be performed by software or hardware installed on the base station and the network function node of the core network. As shown in FIG. 4, the method may include the following steps.

S410: A base station determines that a quantity of users receiving one or more multicast group services is greater than a mode conversion trigger condition (for example, a preset threshold), or determines, based on a resource status thereof, to trigger a mode conversion, converts a transmission mode of the one or more multicast group services from a dedicated mode to a shared mode, and sends an access network message to an AMF. The access network message includes first multicast group information. The first multicast group information includes a multicast group identifier such as a TMGI or a multicast group identifier list. The access network message may also include first user identifier information (including a user identifier 1 or a user identifier 1 list), for example, a 5G_GUTI. The first multicast group information is used for indicating one or more to-be-switched multicast group services, and the first user identifier information is used for indicating one or more to-be-switched terminal devices.

In S410, the base station may select a target AMF that supports a mode conversion operation, for example, may select the target AMF according to the user identifier 1.

S412: A target AMF finds, by using first user identifier information, an original AMF that serves the user, and obtains corresponding second user identifier information such as an SUPI from the original AMF. Then, the target AMF invokes a multicast session update operation such as a Nmbsmf_Session_Update operation of the MB-SMF. Parameters carried the target AMF include the first multicast group information (including the multicast group identifier or the multicast group identifier list), and may also include the first user identifier information (including the user identifier 1 or the user identifier 1 list) or the second user identifier information (including a user identifier 2 or a user identifier 2 list). In addition, the target AMF may carry an identifier of the target AMF.

In S412, if the multicast group identifier list carried in the access network message includes a plurality of multicast group identifiers, the AMF may also invoke the multicast session update operation of the MB-SMF once for each multicast group identifier.

S414: An MB-SMF invokes a mode conversion notification operation of an MBSF. For example, an Nmbsf_ModeSwitch_Notify operation is invoked. The MB-SMF carries parameters carried when the AMF invokes the multicast session update operation of the MB-SMF and including the first multicast group information (the multicast group identifier or the multicast group identifier list), and one of the first user identifier information (the user identifier 1 or the user identifier 1 list) and the second user identifier information (the user identifier 2 or the user identifier 2 list), and may also carry the identifier of the target AMF.

S416: The MBSF obtains AMF information through a unified data management (UDM) function, and obtains a user identifier 2 corresponding to a user identifier 1 through the AMF.

The MBSF may also obtain user identifiers 2 of all members of a multicast group by using a multicast group identifier carried in a case that the mode conversion notification operation is invoked. The MBSF invokes a message transmission service operation such as a Namf_Communication_N1N2MessageTransfer operation of the AMF for the user identifier 1 or the user identifier 2 one by one, and carries a mode conversion notification. The mode conversion notification may be a NAS Mode Switch message. The mode conversion notification may carry second multicast group information and mode information. The second multicast group information includes a multicast group identifier or a multicast group identifier list (that is, multicast group identifier parameters inputted by the AMF). The mode information is used for indicating to convert to a dedicated mode, a shared mode, a unicast mode, or a multicast mode. Alternatively, the mode information is not carried, and the dedicated mode, the shared mode, the unicast mode, or the multicast mode may be indicated by default. This is determined according to a predetermined agreement. In this embodiment, a transmission mode indicated by the mode information carried by the mode conversion notification is the shared mode. That is, a terminal device corresponding to the user identifier 1 or the user identifier 2 is indicated to convert a transmission mode of a multicast service indicated by the multicast group identifier or the multicast group identifier list carried in the mode conversion notification from the dedicated mode to the shared mode.

S418: The AMF forwards a mode conversion notification to a corresponding UE.

Figure 5:
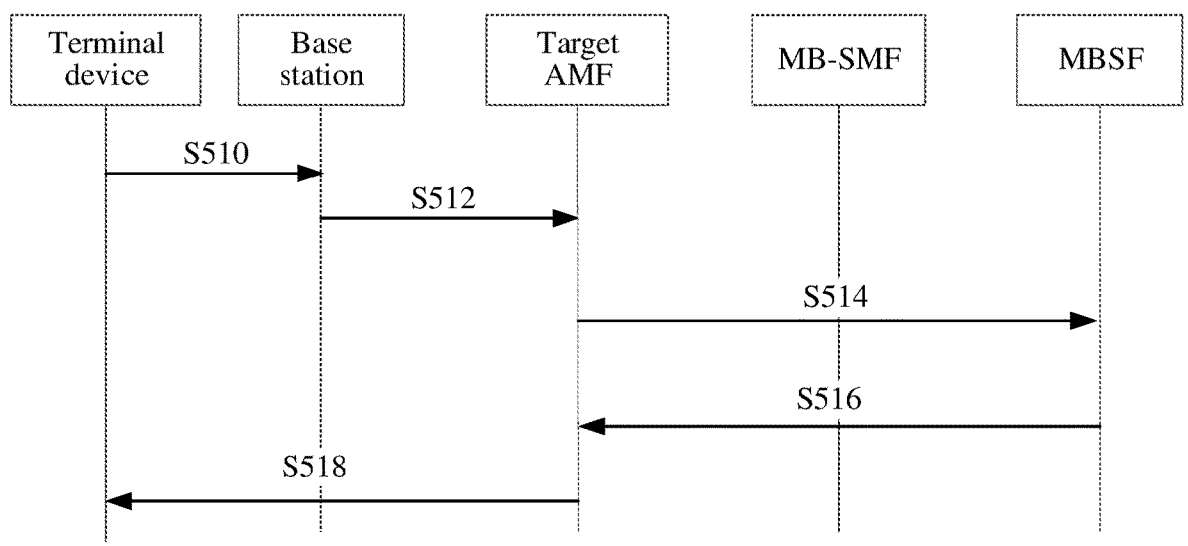
FIG. 5 is another schematic flowchart of a transmission mode conversion indication method according to an embodiment of the present disclosure.

FIG. 5 is another schematic flowchart of a transmission mode conversion indication method according to an embodiment of the present disclosure. The method 500 is implemented by a terminal device, a base station, and a network function node of a core network. In other words, the method may be performed by software or hardware installed on the terminal device, the base station, and the network function node of the core network. As shown in FIG. 5, the method may include the following steps.

S510: A terminal device reports a wireless message to a base station, where the wireless message includes first multicast group information, the first multicast group information may include a multicast group identifier or a multicast group identifier list, for example, a TMGI or a TMGI list, the wireless message may further include first user identifier information, and the first user identifier information may include a user identifier 1 or a user identifier 1 list, for example, a 5G_GUTI.

S512: The base station sends an access network message to a target AMF, where the access network message includes the first multicast group information, and may further include the first user identifier information.

In S512, the base station may select a target AMF that supports a mode conversion operation. If a received wireless message includes a user identifier 1, the target AMF may be selected according to the user identifier 1.

S514: The target AMF invokes a mode conversion notification operation such as an Nmbsf_ModeSwitch_Notify operation of an MBSF, where at least a first multicast group identifier is carried. In addition, The AMF may further carry the first user identifier information or second user identifier information when invoking the mode conversion notification operation of the MBSF.

If the user identifier 1 is included in S512, the target AMF may find, by using the user identifier 1, an original AMF that serves the user, and obtain a corresponding user identifier 2 (that is, the second user identifier information) from the original AMF. That is, the target AMF may carry a user identifier 2 or a user identifier 2 list, or may carry the user identifier 1 or the user identifier 1 list when invoking the mode conversion notification operation. In addition, the target AMF may further carry an identifier of the target AMF when invoking the mode conversion notification operation.

If the first multicast group information includes a plurality of group identifiers, the target AMF may invoke the mode conversion notification operation of the MBSF once for each multicast group identifier.

S516: The MBSF may obtain AMF information through the UDM, and obtain a user identifier 2 corresponding to the user identifier 1 through the AMF.

The MBSF may alternatively obtain user identifiers 2 of all members of a multicast group through the multicast group identifier, and the MBSF invokes a message transmission service operation of the target AMF for each user identifier 1 or each user identifier 2. For example, a Namf_Communication_N1N2MessageTransfer operation is invoked, and a mode conversion notification such as a NAS Mode Switch message is carried. The mode conversion notification may carry second multicast group information and mode information. The second multicast group information includes a multicast group identifier or a multicast group identifier list (that is, multicast group identifier parameters inputted by the AMF). The mode information is used for indicating to convert to a dedicated mode, a shared mode, a unicast mode, or a multicast mode. Alternatively, the mode information is not carried, and the dedicated mode, the shared mode, the unicast mode, or the multicast mode may be indicated by default. This is determined according to a predetermined agreement.

S518: The AMF forwards the mode conversion notification to the corresponding UE.

Figure 6:
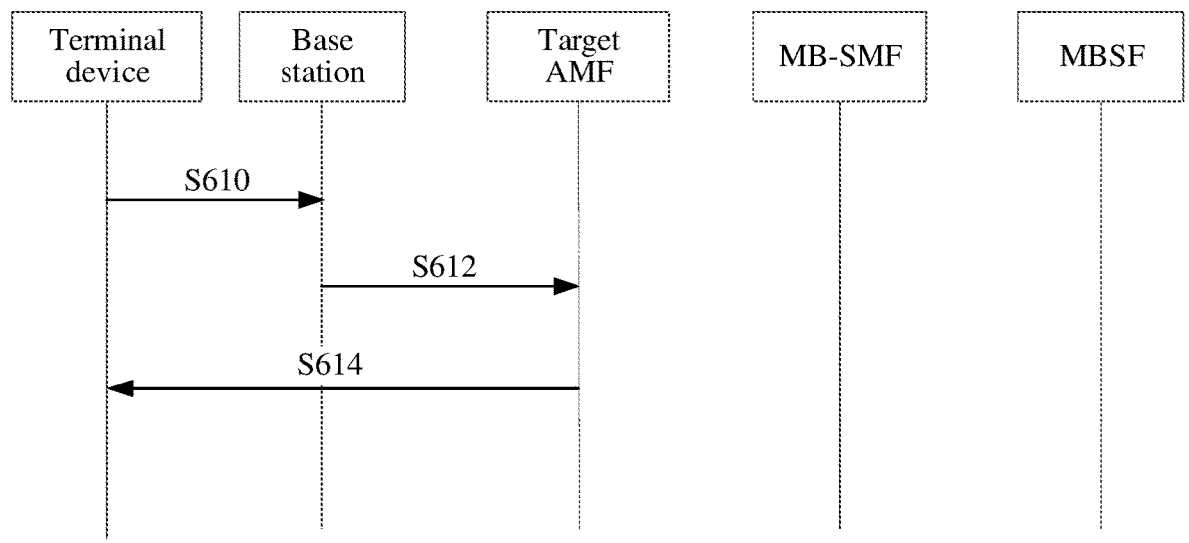
FIG. 6 is another schematic flowchart of a transmission mode conversion indication method according to an embodiment of the present disclosure.

FIG. 6 is another schematic flowchart of a transmission mode conversion indication method according to an embodiment of the present disclosure. The method 600 is implemented by a terminal device, a base station, and a network function node of a core network. In other words, the method may be performed by software or hardware installed on the terminal device, the base station, and the network function node of the core network. As shown in FIG. 6, the method may include the following steps.

S610: A terminal device reports a wireless message to a base station.

The step is the same as S510 in the method 500. For details, reference may be made to the description of S510.

S612: The base station determines that a quantity of users receiving one or more group services is greater than or less than a mode conversion trigger condition, or determines, based on a resource status thereof, to trigger a mode conversion, and sends an access network message to a target AMF. The access network message carries second multicast group information and second user identifier information. The second multicast group information includes a multicast group identifier such as a TMGI or a multicast group identifier list. The second user identifier information may include a user identifier 1 such as a 5G_GUTI or a user identifier 1 list. The base station may select a target AMF that supports a mode conversion operation, for example, may select the target AMF according to the user identifier 1.

In this embodiment, the second multicast group information may be the same as or may be different from the first multicast group information in the wireless message reported by the terminal device. For example, the second multicast group information may include the first multicast group information. Similarly, the second user identifier information may be the same as or may be different from the first user identifier information carried in the wireless message. For example, the second user identifier information may include the first user identifier information.

S614: The target AMF notifies UEs indicated by the second user identifier information one by one to perform the mode conversion.

The target AMF may find, by using the second user identifier information, an original AMF that serves the user, and obtain corresponding third user identifier information such as an SUPI from the original AMF, and may further obtain a user context. The AMF notifies the UE corresponding to the user identifier 1 or a user identifier 2 one by one to perform the mode conversion. For example, a NAS Mode Switch message is sent, and the message may carry third multicast group information and mode information. The third multicast group information may include a multicast group identifier or a multicast group identifier list, which may be the same as or may be different from the second multicast group information. For example, the multicast group identifier list included in the second multicast group information may include a plurality of multicast group identifiers. However, the currently notified UE only involves one or more multicast group services. Therefore, the target AMF may notify only the UE to perform the mode conversion for the one or more multicast group services. The mode information is the same as that in the foregoing embodiments, and details are not described herein again.

After S614, the terminal device may also send a mode switch request to the target AMF. The AMF invokes, after receiving the mode switch request, the MB-SMF to perform the multicast session update operation.

Figure 7:
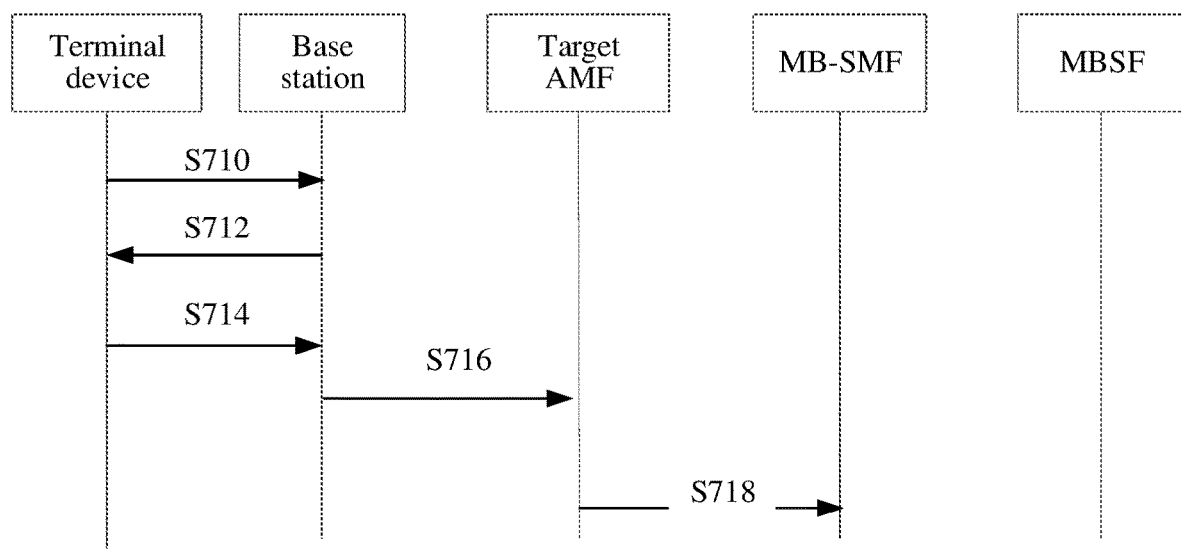
FIG. 7 is another schematic flowchart of a transmission mode conversion indication method according to an embodiment of the present disclosure.

FIG. 7 is another schematic flowchart of a transmission mode conversion indication method according to an embodiment of the present disclosure. The method 700 is implemented by a terminal device, a base station, and a network function node of a core network. In other words, the method may be performed by software or hardware installed on the terminal device, the base station, and the network function node of the core network. As shown in FIG. 7, the method may include the following steps.

S710: The terminal device sends a wireless message to the base station, and reports information, where the information includes first multicast group information and a user identifier 1 such as a C-RNTI (cell temporary user identifier).

S712: The base station determines that a quantity of users receiving one or more multicast group services is greater than or less than a mode conversion trigger condition, or determines, based on a resource status thereof, to trigger a mode conversion, and sends a mode conversion notification to a notified UE corresponding to the user identifier 1, to notify the UE to perform the mode conversion. For example, an RRC Mode Switch message is sent, and the message carries second multicast group information and mode information. The second multicast group information may be the same as or may be different from the first multicast group information in the wireless message sent by the terminal device. That is, the base station determines that a multicast service on which the mode conversion is performed may be the same as or may be different from the multicast service reported by the terminal device. For example, the second multicast group information may include the first multicast group information. The mode information may indicate to convert to a dedicated mode, a shared mode, a unicast mode, or a multicast mode, and the mode information is not carried and the dedicated mode, the shared mode, the unicast mode, or the multicast mode may be indicated by default. This may be determined according to a predetermined agreement.

S714: The UE performs a mode conversion operation after receiving the mode conversion notification, and sends a mode conversion request to the base station, for example, sending a Multicast Session Update request that carries a multicast group identifier or a multicast group identifier list and may also carry the mode information.

S716: The base station forwards the mode conversion request to a target AMF, and adds a RAN (radio access network node) trigger indication that is used for indicating that the request is triggered by a RAN to the forwarded mode conversion request.

S718: The target AMF invokes a mode conversion notification of the MB-SMF, where invocation parameters include a multicast group identifier or a multicast group identifier list (which may be the same as that in the received mode conversion request), may further include the mode information, and may further include the trigger indication. The MB-SMF releases, according to the trigger indication, and the multicast group identifier or the multicast group identifier list, a service of the base station to a user plane corresponding to the multicast group identifier or the multicast group identifier list. For example, after continuously receiving a plurality of notifications that carry the trigger indication, the MB-SMF performs a release operation in a case that no notification is received for a period of time.

Figure 8:
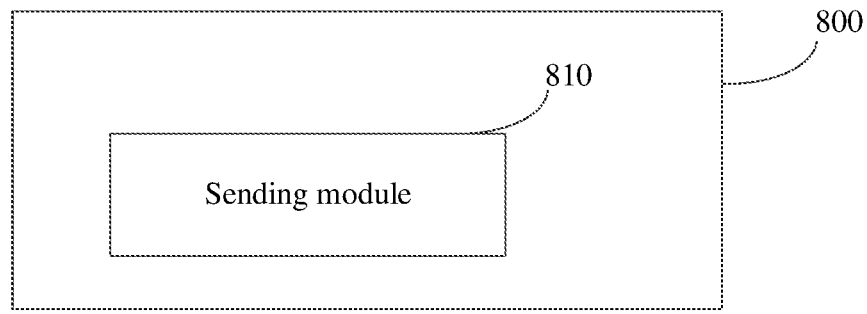
FIG. 8 is a schematic structural diagram of an access network device according to an embodiment of the present disclosure.

FIG. 8 is a schematic structural diagram of an access network device according to an embodiment of the present disclosure. As shown in FIG. 6, the access network device 800 includes: a sending module 810, configured to send a first message to a core network or send a second message to a terminal device, so as to indicate that a transmission mode conversion is required, where the first message carries first user information and first multicast group information.

In a possible implementation, the second message carries the first multicast group information.

In a possible implementation, the first message carries mode information, or the second message carries mode information, where the mode information is used for indicating a transmission mode of multicast service data.

In a possible implementation, the transmission mode indicated by the mode information includes one of the following: a dedicated mode, a shared mode, a unicast mode, and a multicast mode.

In a possible implementation, the first multicast group information includes: a multicast group identifier or a multicast group identifier list.

In a possible implementation, the first user information includes: a first user identifier or a first user identifier list.

In a possible implementation, the access network device further includes: a first receiving module, configured to receive, before the first message or the second message is sent, a third message sent by the terminal device, where the third message carries second user information and second multicast group information, and the second multicast group information is used for indicating a multicast group that requires the transmission mode conversion.

In a possible implementation, the second multicast group information includes a multicast group identifier or a multicast group identifier list, and/or the second user information includes a second user identifier.

In a possible implementation, the access network device further includes: a second receiving module, configured to receive, after the second message is sent to the terminal device, a mode conversion request sent by the terminal device, where the mode conversion request carries the first multicast group information; and a forwarding module, configured to send a fourth message to the core network, where the fourth message includes the mode conversion request and a trigger indication, where the trigger indication is used for indicating that the mode conversion request is triggered by a radio access network node.

In a possible implementation, the access network device further includes: a decision module, configured to determine, before the first message or the second message is sent, that a quantity of target users is greater than or less than a preset transmission mode conversion trigger condition, where the quantity of target users is a total quantity of users receiving a multicast service corresponding to the first multicast group information; or determine, based on a resource status of the base station, that the transmission mode conversion is required.

The access network device provided in this embodiment of the present disclosure can implement the processes implemented by the base station in the method embodiments of FIG. 1 to FIG. 7 and achieve the same effects. To avoid repetition, details are not described herein again.

Figure 9:
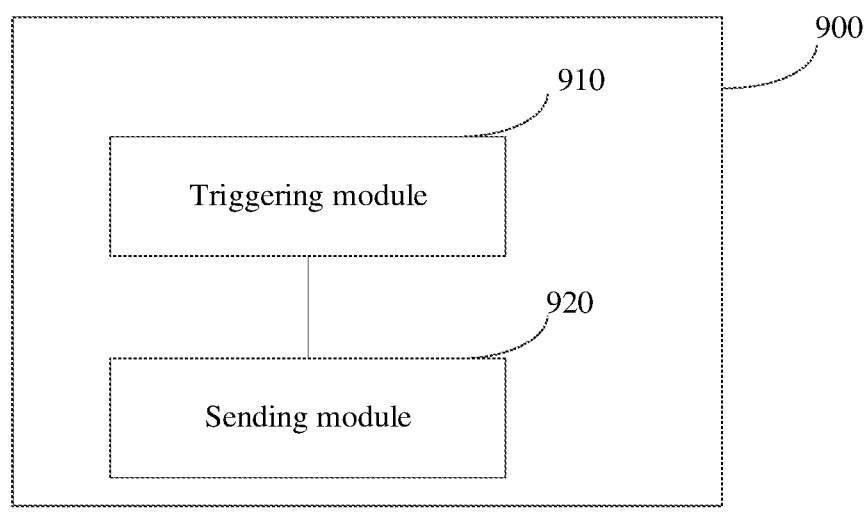
FIG. 9 is a schematic structural diagram of a core network device according to an embodiment of the present disclosure.

FIG. 9 is a schematic structural diagram of a core network device according to an embodiment of the present disclosure. As shown in FIG. 9, the core network device 900 includes: a triggering module 910, configured to trigger a sending module 920 in a case that a first message carrying first multicast group information and first user information is received, or an operation with the first multicast group information and the first user information as parameters is invoked; and the sending module 920, configured to send a transmission mode conversion indication to a terminal device associated with the first user information.

In a possible implementation, the first multicast group information includes: a multicast group identifier or a multicast group identifier list.

In a possible implementation, the first user information includes: a first user identifier or a first user identifier list. The sending a transmission mode conversion indication to a terminal device associated with the first user information comprises: sending the transmission mode conversion indication to a terminal device indicated by the first user identifier, or sending the transmission mode conversion indication to one or more terminal devices indicated by the first user identifier list.

In a possible implementation, the first user information includes: a first user identifier or a first user identifier list. the sending a transmission mode conversion indication to a terminal device associated with the first user information comprises: obtaining a second user identifier according to the first user identifier, and sending the transmission mode conversion indication to a terminal device indicated by the second user identifier; or obtaining a second user identifier list according to the first user identifier list, and sending the transmission mode conversion indication to one or more terminal devices indicated by the second user identifier list.

In a possible implementation, the transmission mode conversion indication includes third multicast group information, and the third multicast group information is used for indicating a multicast group on which the transmission mode conversion is performed.

In a possible implementation, the third multicast group information includes: a multicast group identifier or a multicast group identifier list.

In a possible implementation, the transmission mode conversion indication includes: mode information. The mode information is used for indicating a transmission mode of multicast service data.

In a possible implementation, the transmission mode includes one of the following: a dedicated mode, a shared mode, a unicast mode, and a multicast mode.

In a possible implementation, the core network device may further include: a receiving module, configured to receive, after the transmission mode conversion indication is sent to the terminal device associated with the first user information, a mode conversion request sent by the terminal device, where the mode conversion request carries third multicast group information; and an invocation module, configured to invoke a session update operation by using the third multicast group information and a trigger indication as invocation parameters, and release a connection corresponding to the third multicast group information.

The core network device provided in this embodiment of the present disclosure can implement the processes implemented by the network function nodes in the method embodiments in FIG. 1 to FIG. 7 and achieve the same effects. To avoid repetition, details are not described herein again.

Figure 10:
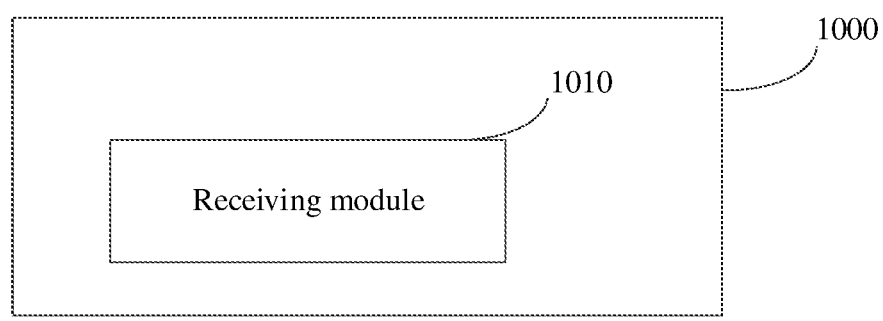
FIG. 10 is a schematic structural diagram of a terminal device according to an embodiment of the present disclosure.

FIG. 10 is a schematic structural diagram of a terminal device according to an embodiment of the present disclosure. As shown in FIG. 10, the terminal device 1000 includes: a receiving module 1010, configured to receive a transmission mode conversion indication, and perform a transmission mode conversion according to the transmission mode conversion indication.

In a possible implementation, the terminal device further includes: a first sending module, configured to send, before the transmission mode conversion indication is received, a third message to a network side, where the third message carries second multicast group information.

In a possible implementation, the second multicast group information includes: a multicast group identifier or a multicast group identifier list.

In a possible implementation, the transmission mode conversion indication includes a multicast group identifier or a multicast group identifier list.

In a possible implementation, the transmission mode conversion indication includes: mode information. The mode information is used for indicating a transmission mode of multicast service data.

In a possible implementation, the transmission mode includes one of the following: a dedicated mode, a shared mode, a unicast mode, and a multicast mode.

In a possible implementation, the terminal device further includes: a second sending module, configured to send, after the transmission mode conversion is performed, a mode conversion request, where the mode conversion request carries the transmission mode conversion indication.

The terminal device provided in this embodiment of the present disclosure can implement the processes implemented by the terminal devices in the method embodiments in FIG. 1 to FIG. 7 and achieve the same effects. To avoid repetition, details are not described herein again.

Figure 11:
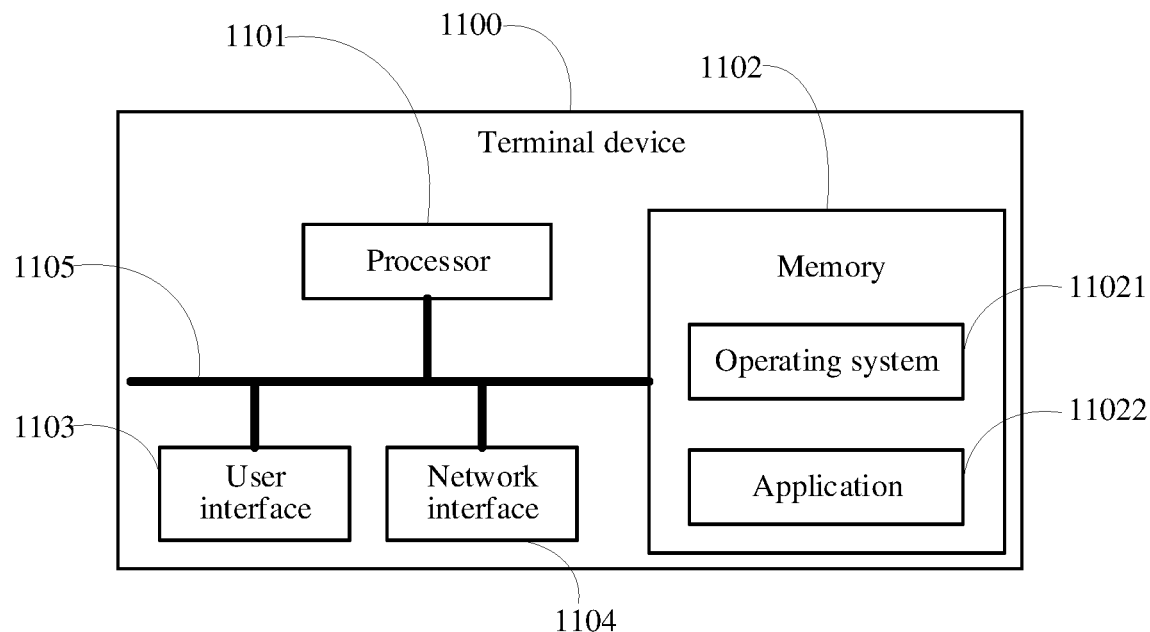
FIG. 11 is a schematic structural diagram of a terminal device according to an embodiment of the present disclosure.

FIG. 11 is a block diagram of a terminal device according to another embodiment of the present disclosure. A terminal device 1100 shown in FIG. 11 includes at least one processor 1101, a memory 1102, at least one network interface 1104, and a user interface 1103. All the components in the terminal device 1100 are coupled together by using a bus system 1105. It may be understood that the bus system 1105 is configured to implement connection and communication between the components. In addition to a data bus, the bus system 1105 further includes a power bus, a control bus, and a status signal bus. However, for ease of clear description, all types of buses are marked as the bus system 1105 in FIG. 11.

The user interface 1103 may include a display, a keyboard, or a clicking device (for example, a mouse), a trackball, a touch panel or a touchscreen, and the like.

It may be understood that, the memory 1102 in this embodiment of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms such as a static RAM (SRAM), a Dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM), are available. The memory 1102 in the system and method described in the embodiments of the present disclosure is intended to include, but is not limited to, the memories and any other memory of a suitable type.

In some implementations, the memory 1102 stores the following element, executable module, or data structure, or a subset thereof, or an extension set thereof: an operating system 11021 and an application 11022.

The operating system 11021 includes various system programs, for example, a frame layer, a core library layer, and a drive layer, used for implementing various basic services and processing tasks based on hardware. The application 11022 includes various applications, for example, a media player and a browser, used for implementing various application services. A program for implementing the method of the embodiments of the present disclosure may be included in the application 11022.

In this embodiment of the present disclosure, the terminal device 1100 further includes: a computer program stored on the memory 1102 and executable by the processor 1101, the computer program, when executed by the processor 1101, implementing the following steps: receiving a transmission mode conversion indication, and performing a transmission mode conversion according to the transmission mode conversion indication.

The method disclosed in the foregoing embodiments of the present disclosure may be applied to the processor 1101, or implemented by the processor 1101. The processor 1101 may be an integrated circuit chip having a signal processing capability. In an implementation process, steps in the foregoing methods can be implemented by using a hardware integrated logical circuit in the processor 1101, or by using instructions in a form of software. The foregoing processor 1101 may be a general purpose processor, a digital signal processor (DSP), an application-specific integrated circuit (ASIC), a field-programmable gate array (FPGA), or another programmable logic device, discrete gate or transistor logic device, or discrete hardware component, and may implement or perform the methods, the steps, and logic block diagrams that are disclosed in the embodiments of the present disclosure. The general-purpose processor may be a microprocessor, or the processor may be any conventional processor or the like. The steps of the methods disclosed with reference to the embodiments of the present disclosure may be directly performed and completed by using a hardware decoding processor, or may be performed and completed by using a combination of hardware and software modules in the decoding processor. The software module may be stored in a non-transitory computer-readable storage medium that is mature in the art, such as a RAM, a flash memory, a ROM, a programmable ROM, an electrically erasable programmable memory, or a register. The non-transitory computer-readable storage medium is located in the memory 1102, and the processor 1101 reads information in the memory 1102, and completes the steps in the foregoing methods in combination with hardware thereof. The non-transitory computer-readable storage medium stores a computer program thereon, the computer program, when executed by the processor 1101, implementing the steps of the method 300 as described above.

It may be understood that, the embodiments described in the embodiments of the present disclosure may be implemented by using software, hardware, firmware, middleware, microcode, or a combination thereof. For hardware implementation, a processing unit may be implemented in one or more application-specific integrated circuits (ASIC), a digital signal processor (DSP), a digital signal processing device (DSPD), a programmable logic device (PLD), a field-programmable gate array (FPGA), a general-purpose processor, a controller, a micro-controller, a microprocessor, and other electronic units configured to execute the functions described in the present disclosure, or a combination of the above.

For implementation by software, the technologies in the embodiments may be implemented by performing the functional modules (for example, a process and a function) in the embodiments of the present disclosure. Software code may be stored in a memory and executed by a processor. The memory may be implemented in the processor or outside the processor.

The terminal device 1100 can implement various processes implemented by the terminal device in FIG. 1 to FIG. 7 described above. To avoid repetition, details are not described herein again.

Figure 12:
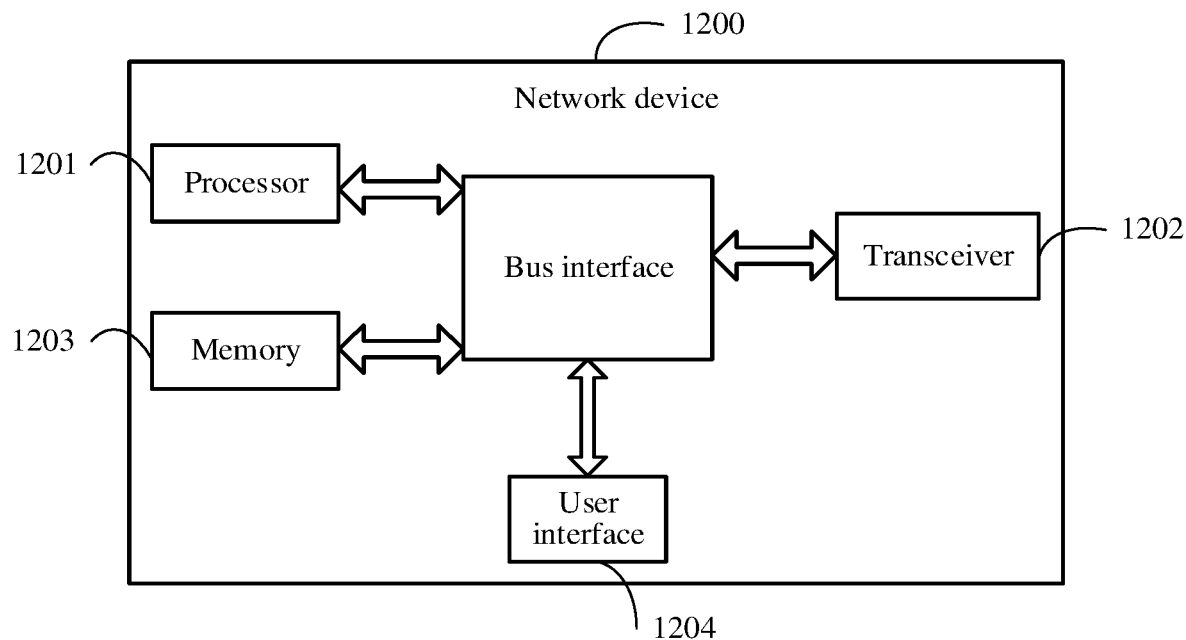
FIG. 12 is a schematic structural diagram of a network device according to an embodiment of the present disclosure.

FIG. 12 is a structural diagram of a network device according to an embodiment of the present disclosure, which can implement the details and the same effects of the methods 100 and 200 as a base station or a network function node. As shown in FIG. 12, a network device 1200 includes a processor 1201, a transceiver 1202, a memory 1203, a user interface 1204, and a bus interface.

In this embodiment of the present disclosure, the network device 1200 further includes: a computer program stored on the memory 1203 and executable on the processor 1201, the computer program, when executed by the processor 1201, implementing the following step: sending a first message to a core network or sending a second message to a terminal device, so as to indicate that a transmission mode conversion is required, where the first message carries first user information and first multicast group information.

Alternatively, the computer program, when executed by the processor 1201, implements the following steps:

receiving the first message carrying the first multicast group information and the first user information, or invoking an operation with first multicast group information and first user information as parameters; and sending a transmission mode conversion indication to a terminal device associated with the first user information.

In FIG. 12, a bus architecture may include any quantity of interconnected buses and bridges, and connects various circuits that are of one or more processors represented by the processor 1201 and of a memory represented by the memory 1203. The bus architecture may further connect various other circuits of a peripheral device, a voltage regulator, a power management circuit, and the like. This is well known in the art, and therefore, no further description is provided in this specification. The bus interface provides an interface. The transceiver 1202 may be a plurality of components, including a transmitter and a receiver, and providing units for communicating with various other apparatuses on a transmission medium. For different UEs, the user interface 1204 may also be an interface capable of externally or internally connecting a required device, the connected device includes, but not limited to, a keypad, a display, a speaker, a microphone, and a joystick.

The processor 1201 is responsible for the management of the bus architecture and normal processing, and the memory 1203 may store data used when the processor 1201 performs an operation.

The network device 1200 can implement various processes and the same effects implemented by the network side or the network device in FIG. 1 to FIG. 5 described above. To avoid repetition, details are not described herein again.

An embodiment of the present disclosure further provides a non-transitory computer-readable storage medium, storing a computer program, the computer program, when executed by a processor, implementing the various processes and the same technical effects implemented by the base station, the network function node, or the terminal device of the various embodiments shown in FIG. 1 to FIG. 7 described above. To avoid repetition, details are not described herein again. The non-transitory computer-readable storage medium is, for example, a read-only memory (ROM), a random access memory (Random Access Memory, RAM), a magnetic disk, an optical disc, or the like.

It should be noted that, terms "include", "comprise", and any variants thereof in this specification are intended to cover a non-exclusive inclusion. Therefore, in the context of a process, method, object, or apparatus that includes a series of elements, the process, method, object, or apparatus not only includes such elements, but also includes other elements not specified expressly, or may include inherent elements of the process, method, object, or apparatus. Without more limitations, elements defined by the sentence "including one" does not exclude that there are still other same elements in the processes, methods, objects, or apparatuses.

Through the descriptions of the foregoing implementations, a person skilled in the art may clearly understand that the methods according to the foregoing embodiments may be implemented by means of software and a necessary general hardware platform, and certainly, may alternatively be implemented by hardware, but in many cases, the former manner is a better implementation. Based on such an understanding, the technical solutions of the present disclosure essentially, or the part contributing to the prior art, may be presented in the form of a software product. The computer software product is stored in a non-transitory storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are illustrative instead of limitative. Enlightened by the present disclosure, a person of ordinary skill in the art can make many forms without departing from the idea of the present disclosure and the scope of protection of the claims. All of the forms fall within the protection of the present disclosure.

What is claimed is:

1. A transmission mode conversion indication method, performed by a base station and comprising:
  sending a first message to a core network or sending a second message to a terminal device, so as to indicate that a transmission mode conversion is required, wherein the first message carries first user information and first multicast group information; wherein
  the second message carries the first multicast group information;
  the first message carries mode information, or the second message carries mode information, wherein the mode information is used for indicating a transmission mode of multicast service data; and
  the transmission mode indicated by the mode information comprises a shared mode or a dedicated mode;
  after the sending the second message to the terminal device, the method further comprises:
  receiving a mode conversion request sent by the terminal device, wherein the mode conversion request carries the first multicast group information; and
  sending a fourth message to the core network, wherein the fourth message comprises the mode conversion request and a trigger indication, wherein the trigger indication is used for indicating that the mode conversion request is triggered by a radio access network node.

2. The method according to claim 1, wherein the first multicast group information comprises: a multicast group identifier or a multicast group identifier list; and/or the first user information comprises: a first user identifier or a first user identifier list.

3. The method according to claim 1, wherein before sending the first message or the second message, the method further comprises:
  receiving a third message sent by the terminal device, wherein the third message carries second user information and second multicast group information, and the second multicast group information is used for indicating a multicast group that requires the transmission mode conversion; wherein
  the second multicast group information comprises: a multicast group identifier or a multicast group identifier list; and/or the second user information comprises: a second user identifier.

4. The method according to claim 1, wherein before sending the first message or the second message, the method further comprises:
  determining that a quantity of target users is greater than or less than a preset transmission mode conversion trigger condition, wherein the quantity of target users is a total quantity of users receiving a multicast service corresponding to the first multicast group information; or
  determining, based on a resource status of the base station, that the transmission mode conversion is required.

5. A transmission mode conversion indication method, performed by a network function node and comprising:
   receiving a first message carrying first multicast group information and first user information, or invoking an operation with first multicast group information and first user information as parameters; and
   sending a transmission mode conversion indication to a terminal device associated with the first user information; wherein
   the first user information comprises: a first user identifier or a first user identifier list; and
   the sending the transmission mode conversion indication to the terminal device associated with the first user information comprises: obtaining a second user identifier according to the first user identifier, and sending the transmission mode conversion indication to a terminal device indicated by the second user identifier; or obtaining a second user identifier list according to the first user identifier list, and sending the transmission mode conversion indication to one or more terminal devices indicated by the second user identifier list.

6. The method according to claim 5, wherein the first multicast group information comprises: a multicast group identifier or a multicast group identifier list.

7. The method according to claim 5, wherein
   the first user information comprises: a first user identifier or a first user identifier list; and
   the sending the transmission mode conversion indication to the terminal device associated with the first user information comprises: sending the transmission mode conversion indication to a terminal device indicated by the first user identifier, or sending the transmission mode conversion indication to one or more terminal devices indicated by the first user identifier list.

8. The method according to claim 5, wherein the transmission mode conversion indication comprises third multicast group information, and the third multicast group information is used for indicating a multicast group on which a transmission mode conversion is performed; and
   the third multicast group information comprises: a multicast group identifier or a multicast group identifier list.

9. The method according to claim 5, wherein the transmission mode conversion indication comprises mode information, and the mode information is used for indicating a transmission mode of multicast service data; and
   the transmission mode comprises one of following: a dedicated mode, a shared mode, a unicast mode, and a multicast mode.

10. The method according to claim 8, wherein after the sending the transmission mode conversion indication to the terminal device associated with the first user information, the method further comprises:
   receiving a mode conversion request sent by the terminal device, wherein the mode conversion request carries the third multicast group information;
   invoking a session update operation by using the third multicast group information and a trigger indication as invocation parameters; and
   releasing a connection corresponding to the third multicast group information.

11. A transmission mode conversion indication method, performed by a terminal device, the method comprising:
   receiving a transmission mode conversion indication; and
   performing a transmission mode conversion according to the transmission mode conversion indication; wherein
   the transmission mode conversion indication comprises a multicast group identifier or a multicast group identifier list;
   the transmission mode conversion indication comprises mode information, and the mode information is used for indicating a transmission mode of multicast service data; and
   the transmission mode comprises a dedicated mode or a shared mode;
   after the performing the transmission mode conversion, the method further comprises:
   sending a mode conversion request, wherein the mode conversion request carries the transmission mode conversion indication.

12. The method according to claim 11, wherein before the receiving the transmission mode conversion indication, the method further comprises:
   sending a third message to a network side, wherein the third message carries second multicast group information; wherein
   the second multicast group information comprises: a multicast group identifier or a multicast group identifier list.

13. An access network device, comprising: a memory, a processor, and a computer program stored on the memory and executable on the processor, the computer program, when executed by the processor, implementing steps of the method according to claim 1.

14. A core network device, comprising: a memory, a processor, and a computer program stored on the memory and executable on the processor, the computer program, when executed by the processor, implementing steps of the method according to claim5.

15. A terminal device, comprising: a memory, a processor, and a computer program stored on the memory and executable on the processor, the computer program, when executed by the processor, implementing steps of the method according to claim 11.

* * * * *